United States Patent [19]
Truckenbrod et al.

[11] Patent Number: 5,209,072
[45] Date of Patent: May 11, 1993

[54] REFRIGERATION TEMPERATURE CONTROL SYSTEM

[75] Inventors: Greg Truckenbrod, Fridley; Paul C. Wacker, Plymouth, both of Minn.

[73] Assignees: Westinghouse Electric Corp.; Honeywell, Inc.

[21] Appl. No.: 853,128

[22] Filed: Mar. 18, 1992

Related U.S. Application Data

[63] Continuation of Ser. No. 641,292, Jan. 15, 1991, abandoned.

[51] Int. Cl.⁵ .............................................. F25D 29/00
[52] U.S. Cl. .......................................... 62/56; 62/213; 62/208; 236/78 D
[58] Field of Search ................ 62/213, 229, 130, 126, 62/208, 56; 236/78 D, 91 F; 318/609; 364/161, 162

[56] References Cited

U.S. PATENT DOCUMENTS 4,257,238  3/1981  Kountz et al. ...................... 62/229
4,509,586  4/1985  Watabe ................................ 62/213
4,519,215  5/1985  Barnett ............................... 62/229

FOREIGN PATENT DOCUMENTS 62-113205  5/1987  Japan ................................ 364/161

Primary Examiner—John M. Sollecito
Attorney, Agent, or Firm—John L. Rooney

[57] ABSTRACT

Apparatus for and method of long-term control of the temperature within a refrigerated space, such as the cargo compartment of a refrigeration truck. The technique employs sensors which monitor both discharge and return air. A control algorithm uses the multiple sensors to control modes of a refrigeration unit capable of supplying cooled or heated air. This causes the temperature within the refrigerated space to remain within a narrow range about a target temperature. The target is chosen to provide maximum safety for the cargo. If the target temperature is too high, the cargo is needlessly exposed to spoilage. If the target temperature is too low, the cargo is subject to the risk of damage from freezing.

12 Claims, 12 Drawing Sheets

REFRIGERATION TEMPERATURE CONTROL SYSTEM

This is a continuation of co-pending application Ser. No. 07/641,292, filed on Jan. 15, 1991, now abandoned and entitled "Refrigeration Temperature Control System" and is assigned to the assignees of the present invention and is herein incorporated by reference.

BACKGROUND OF THE INVENTION

1. Field of the Invention

The present invention is generally related to systems for the control of the temperature within a refrigerated space, and is more particularly related to a refrigeration temperature control system utilizing multiple sensors.

2. Description of the Prior Art

It is known in the art to control the temperature of a space used to store or transport perishable materials, such as foodstuffs. In controlling temperature in such a space, it is most difficult when the space is used to transport the perishable materials such as with refrigeration trucks.

Much of the difficulty arises because of the change in thermal loading caused by large changes in the ambient with respect to time of day, geographical location, and weather conditions. If the temperature within the refrigerated space becomes too high, the cargo is exposed to excess risk of spoilage. If the temperature within the refrigerated space becomes too low, portions of the cargo may be destroyed from freezing.

U.S. Pat. No. 4,715,190 discusses a rudimentary temperature control system. An advanced microprocessor based temperature control system is taught in U.S. Pat. No. 4,663,725, issued to Truckenbrod et al., and incorporated herein by reference. The Truckenbrod et al., system employs temperature sensors for the return and discharge of air. A fault recovery algorithm permits the system to switch between sensors. U.S. Pat. No. 4,589,060, issued to Zinsmeyer, also discusses a microprocessor based temperature control system.

Techniques for control of the refrigeration process are described in U.S. Pat. Nos. 4,742,689 and 4,934,155, issued to Lowes. These Lowes references show control of temperature through the use of hot gas bypass of the compressor in an attempt to maintain a more constant compressor speed.

A highly sophisticated system for temperature control is taught in U.S. Pat. No. 4,918,932, issued to Gustafson et al., and incorporated herein by reference. This system uses an integrated average of the outputs of a discharge sensor and a return sensor to control the refrigeration apparatus.

SUMMARY OF THE INVENTION

The present invention overcomes the disadvantages of the prior art by providing a refrigeration temperature control system having multiple sensors, wherein control of the cooling/heating apparatus at any one time uses one of the multiple sensors based upon the interrelationship of the multiple sensor outputs. In this manner, the control system becomes adaptable to varying conditions, such as ambient temperature, thermal hysteresis within the refrigerated space, and refrigeration capacity as a function of refrigeration demand.

A preferred mode of the present invention utilizes a refrigeration system which can supply either cooled or heated air. By way of example and not intended to be limiting of the invention, sensors are used to monitor the temperature of the discharge and return air. An initial sensor may be selected at the termination of the pull down mode. The sensor controlling the refrigeration system may be changed as a result of the return temperature becoming lower than a set point or the discharge temperature becoming lower than a floor temperature.

The cooling/heating modes of the refrigeration system are changed in response to the various sensor outputs. The resulting control system maintains the temperature within the refrigerated space within a narrow margin about a desired operating temperature.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 3, comprising

DETAILED DESCRIPTION OF THE PREFERRED EMBODIMENTS

Figure 1:
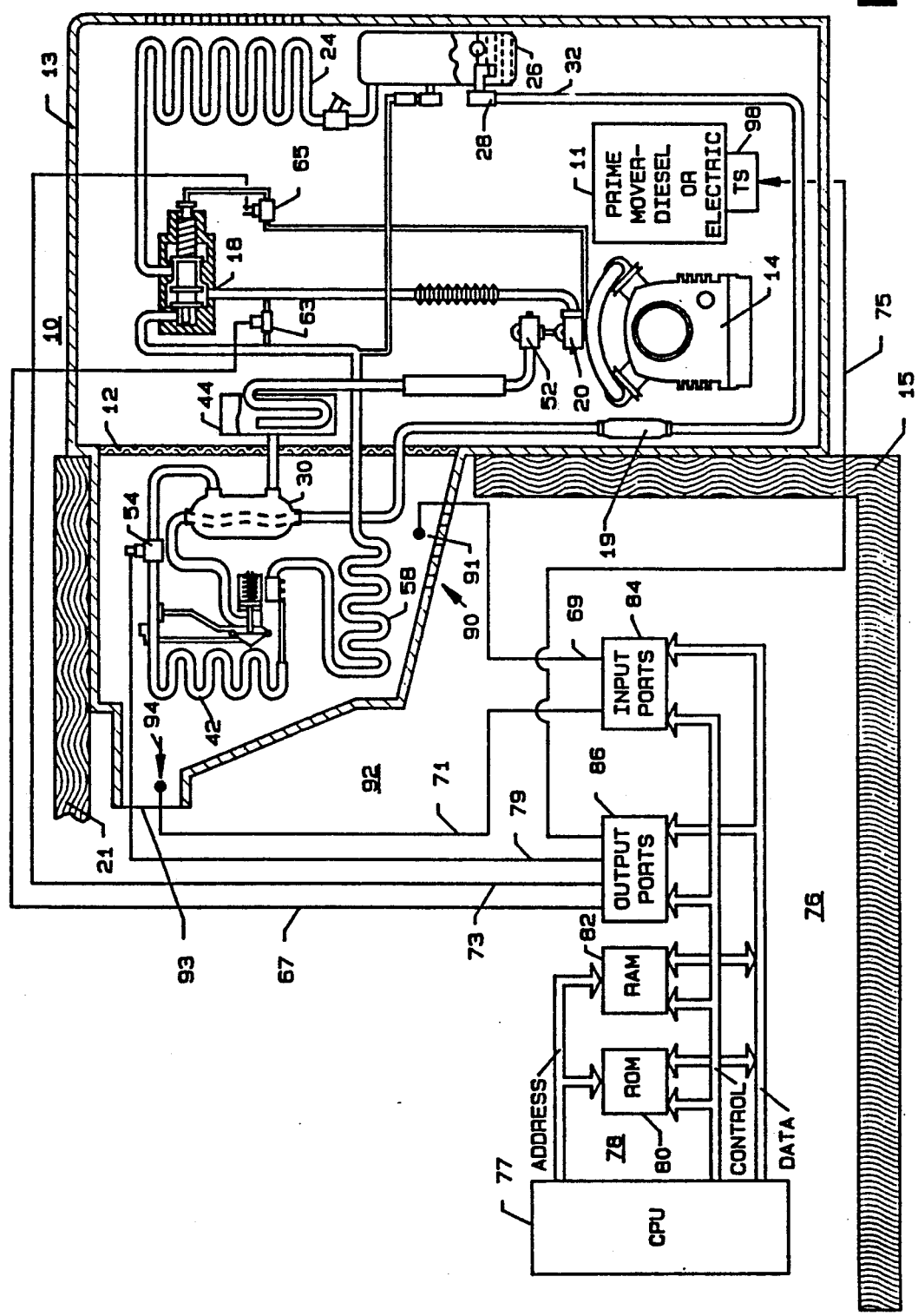
FIG. 1 is a schematic diagram of a refrigeration system employing the present invention.

FIG. 1 is a schematic view of a refrigeration system 10 employing the present invention. In the preferred mode, and not to be interpreted as limiting of the present invention, refrigeration system 10 is incorporated into a refrigeration truck (not shown). Starboard wall 15 and port wall 21 are partially shown encompassing refrigerated space 92. Aperture 12 is located in the forward wall of the refrigerated space for mechanical access of the refrigeration components as shown. Digital control system 76 is shown within refrigerated space 92 as a matter of convenience in illustration only. In actual operation, digital control system 76 is located outside of refrigerated space 92.

Housing 13 encompasses those components of the refrigeration system housed outside of refrigerated space 92. It contains prime mover 11, which is a source of mechanical motion to operate compressor 14. Prime mover 11 may use a number of techniques, but is preferably either a diesel engine or electric motor. The speed of prime mover 11 is controlled by digital control system 76 via cable 75 and interface 98 as is explained in more detail below.

Condenser coil 24, fed by operate compressor 14 via three-way valve 18, serves to exchange heat with the environment through the opening shown in housing 13. This exchange may be dissipation of excess heat in the cooling modes or acquisition of heat for the heating modes. Reservoir 26 collects excess liquid coolant and dispenses it through tubing 32 via exit valve 28 as required. Tubing 32 contains dryer 19. Valves 20 and 52 provide for input to and output from operate compressor 14. Reservoir 44 is placed in the suction line as shown.

Return air from refrigerated space 92 enters the evaporator coil housing via vent 90 and corresponding vents (not shown) in the bottom of the housing. Evaporation coils 42 and 58 cool or heat the return air on the way to discharge port 93. Temperature sensor 91 monitors the temperature of the return air and temperature sensor 94 monitors the temperature of the discharge air. Heat exchanger 30 connects evaporation coils 42 and 58 to the suction line. Modulation valve 54 controls suction line flow in response to digital control system 76 connected via cable 79. Control of modulation valve 54 permits adjustment of the refrigeration system capacity in operation.

Digital control system 76 is a microprocessor controller operated by firmware/software as described in more detail below. Central processing unit 77 runs the control firmware/software. Read only memory 80 is suitable for storage of the control firmware/software and various numerical constants. Random access memory 82 is used for storage of variables and for input and output buffering. Output ports 86 couple to interface 98 via cable 75 to control prime mover 11, to the heat/cool pilot solenoid controlling the three-way heat/cool valve 18 via cable 73, hot gas bypass valve via cable 67, and to modulation valve 54 via cable 79. Input ports 84 couple to return air temperature sensor 91 via cable 69 and to discharge air temperature sensor 94 via cable 71.

Figure 2:
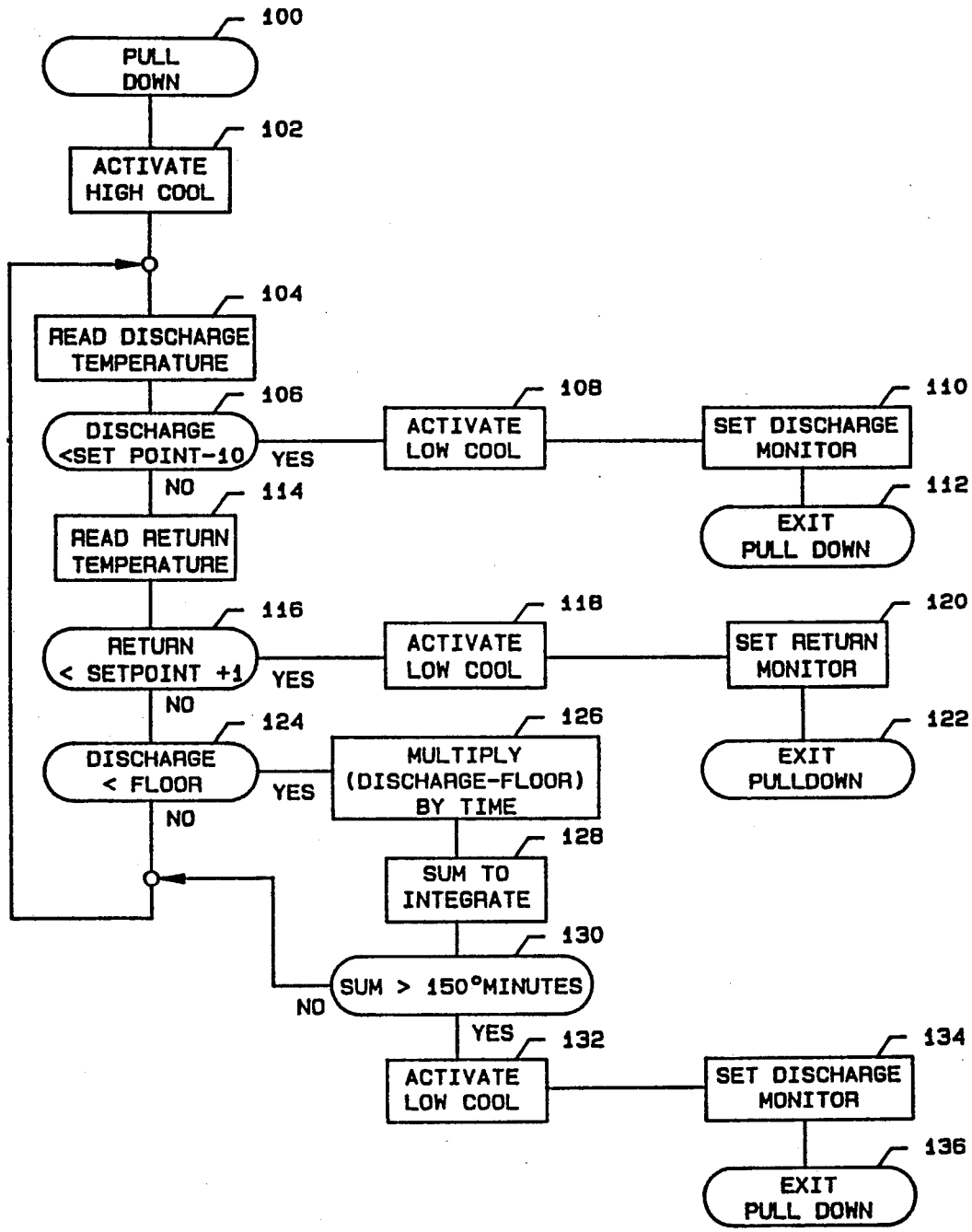
FIG. 2 is a flowchart of an algorithm for pull down mode.
Figure 3A:
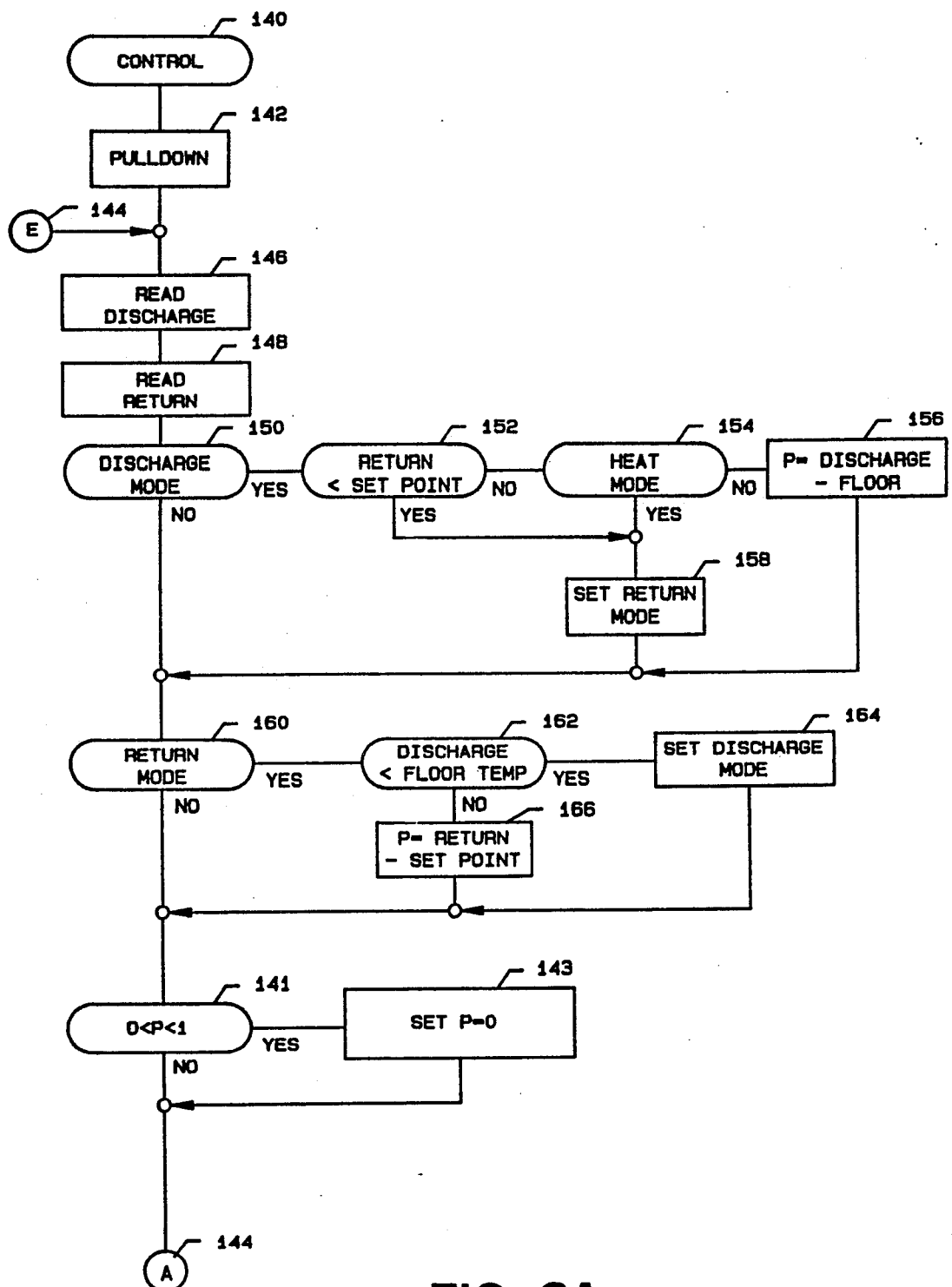
FIGS. 3A, 3B, 3C, 3D, and 3E, is a flowchart of an algorithm for effecting temperature control.
Figure 3B:
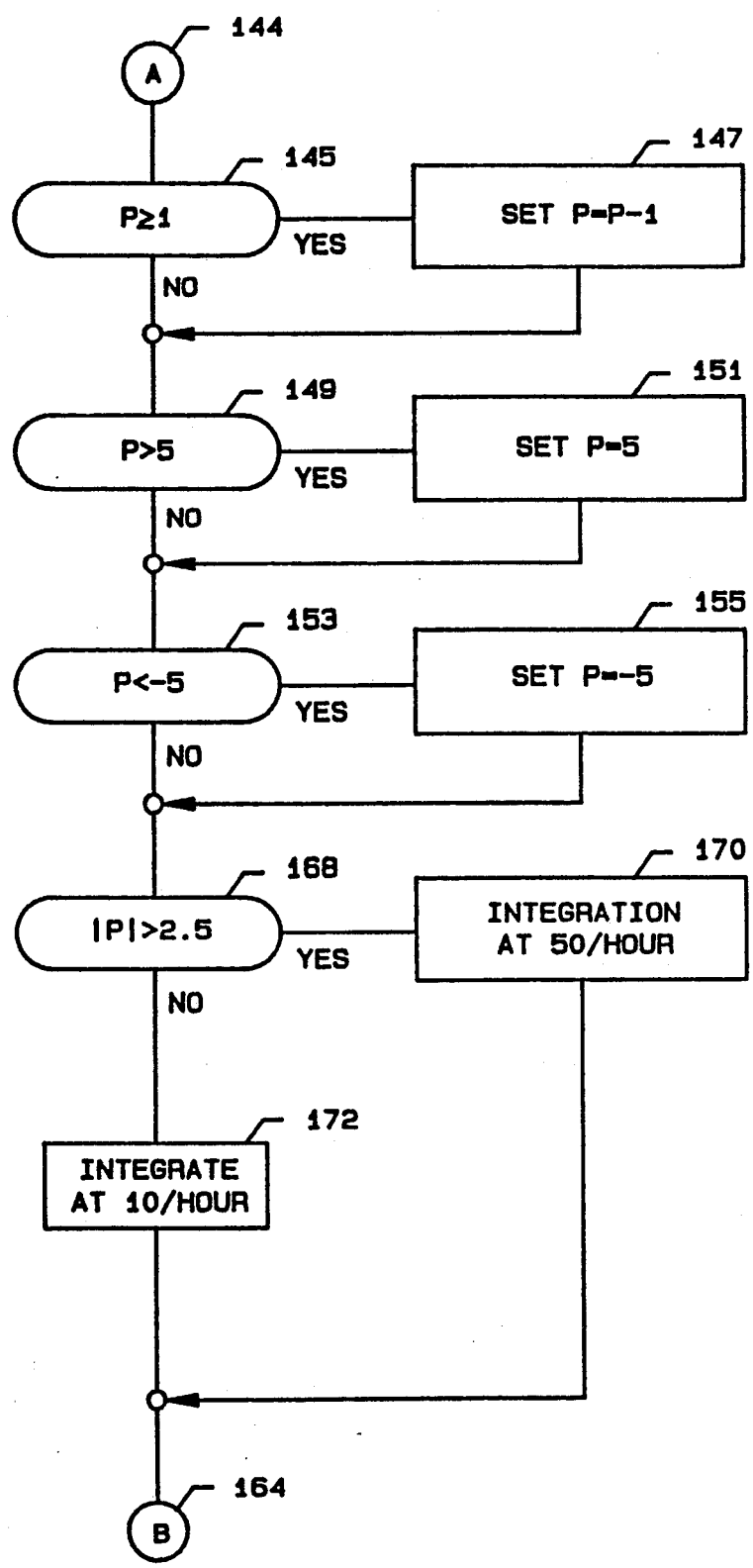
Figure 3C:
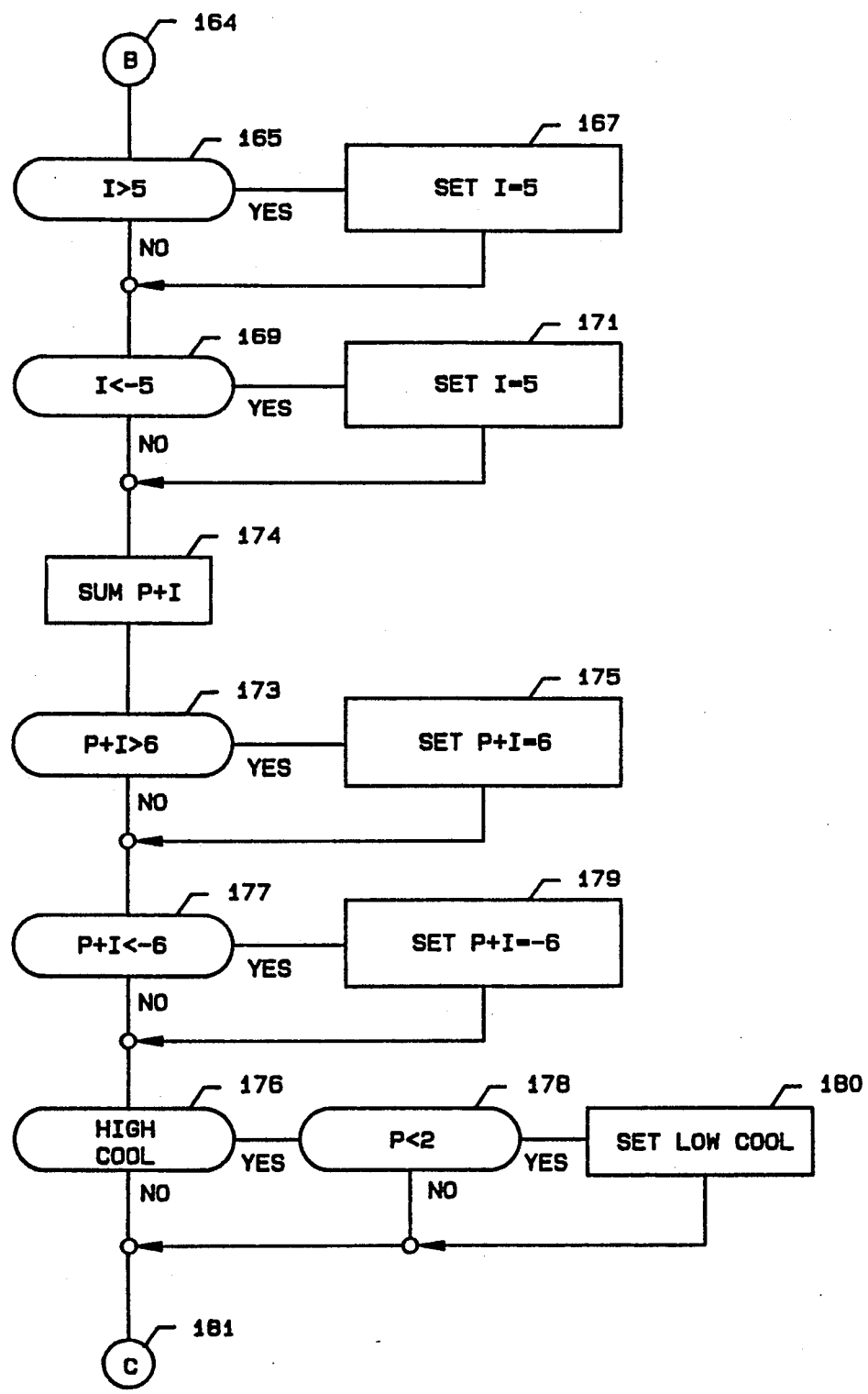
Figure 3D:
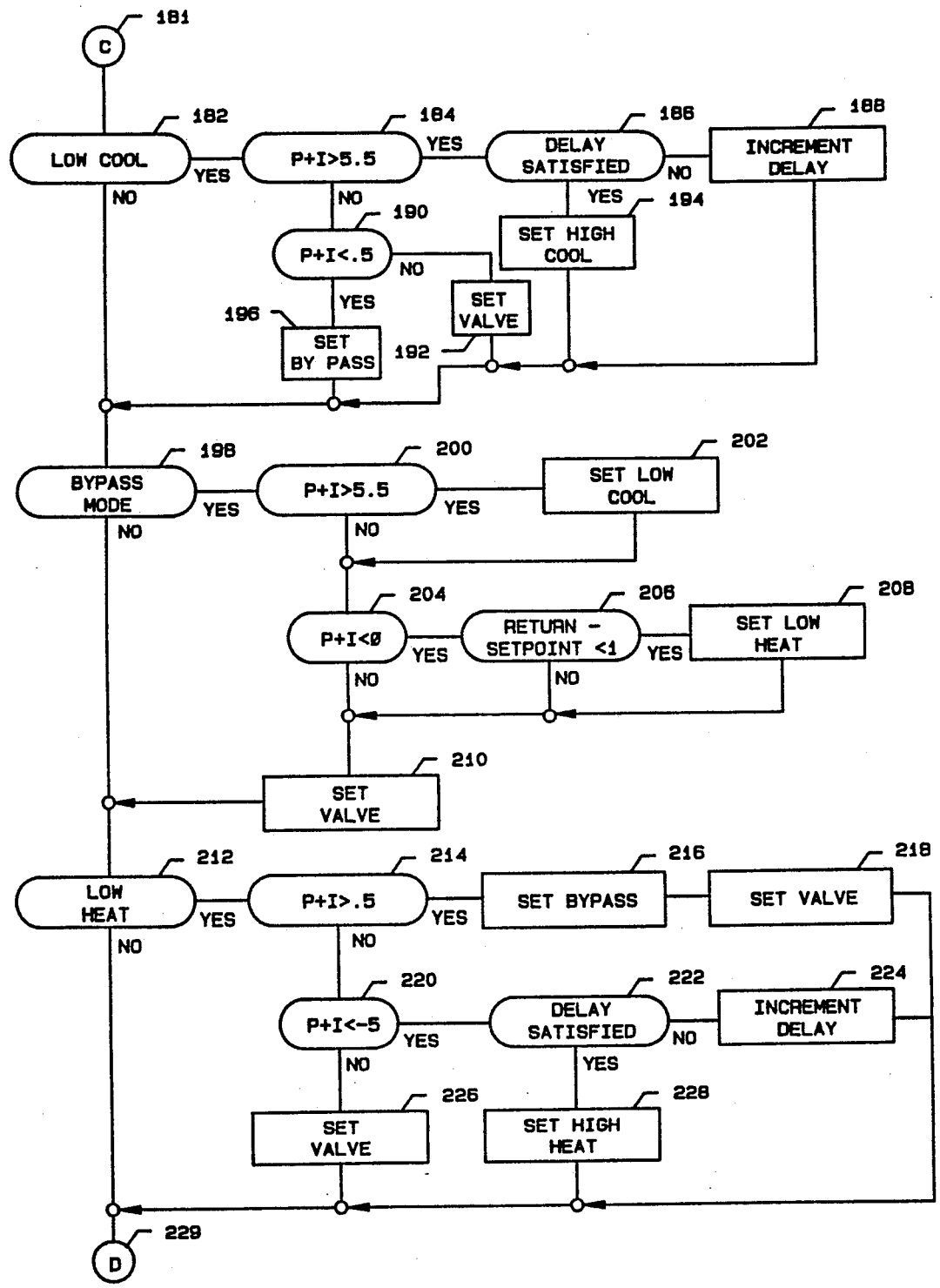
Figure 3E:
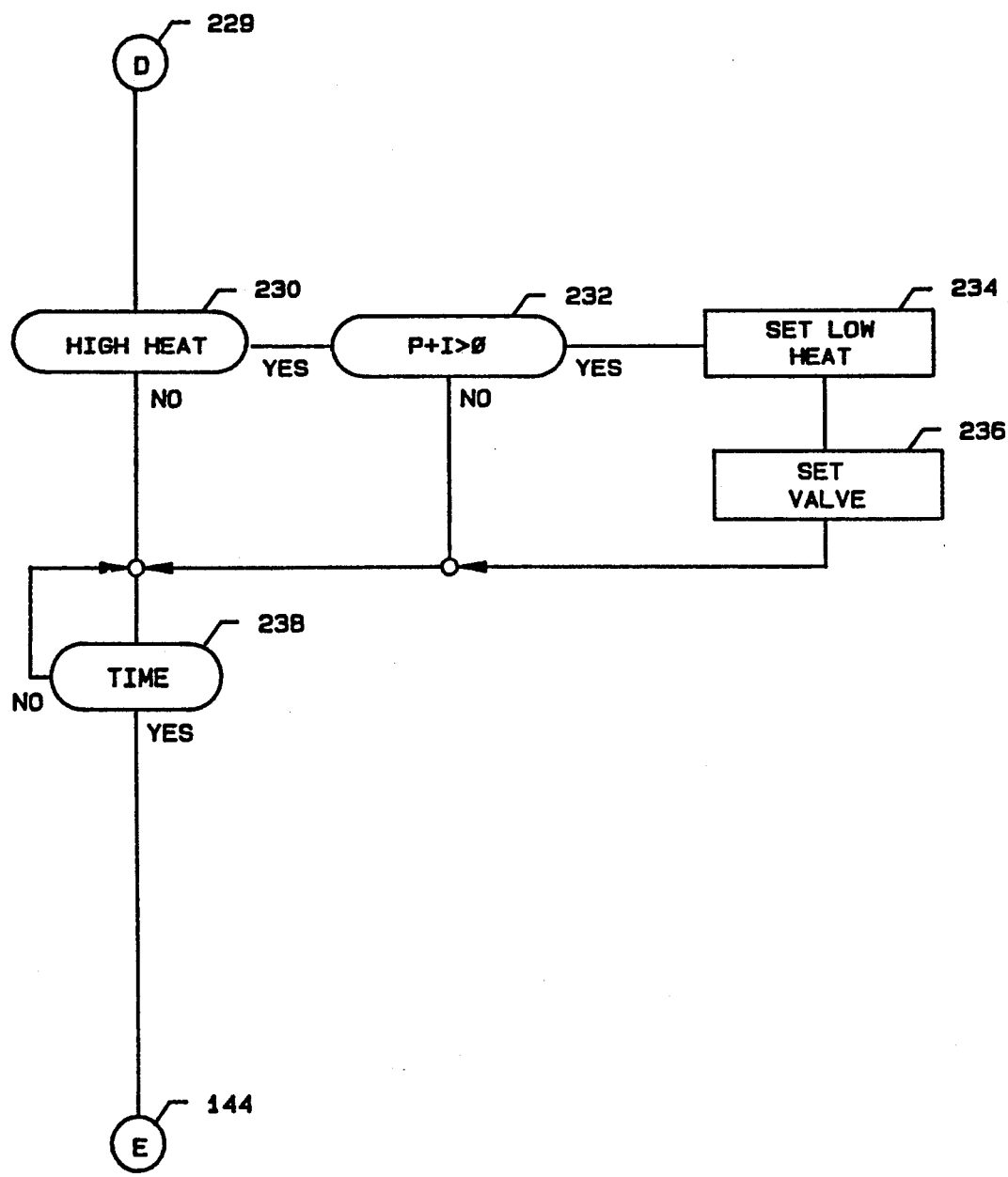

FIG. 2 is flowchart of the operation of the pull down mode in accordance with the preferred embodiment of the present invention. The pull down mode is entered at element 100 Element 102 activates the high cool mode of the refrigeration system 10 (see also FIG. 1). In the pull down mode, refrigeration system 10 operates at its maximum cooling capacity with modulation valve 54 completely open.

The discharge air temperature is read via discharge air temperature sensor 94 at element 104. If the discharge air temperature is more than ten degrees below the set point, element 106 routes control to element 108 which deactivates the high cool mode and activates the low cool mode of refrigeration system 10. In the low cool mode, modulation valve 54 is used to control the cooling capacity. Element 110 sets the discharge monitor before exiting pull down mode at element 112. This indicates that the pull down mode was terminated as a result of reading the discharge air temperature sensor. Such an indication implicitly relates the capacity of refrigeration system 10 to the thermal loading of the particular cargo, refrigerated space volume, ambient conditions, etc.

If the pull down mode is not terminated as a result of the discharge air temperature sensor reading by elements 106 through 112, it is because the measured discharge air temperature is greater than the set point minus ten degrees. Control is transferred to element 114, which reads the output of return air temperature sensor 91. If the return air temperature is less than the set point plus 1, element 116 routes control to element 118 which deactivates high cool mode and activates low cool mode. By setting the return monitor, element 120 indicates that the pull down mode was terminated by reading the return air temperature sensor. Exit is had via element 122.

If the pull down mode is not terminated by either of the normal termination conditions, element 124 determines whether the discharge air temperature is less than the floor temperature. If not, control is returned to element 104 to again search each of the pull down mode termination conditions.

If element 124 determines that the discharge temperature is less than the floor temperature, element 126 multiplies the difference between the discharge temperature and the floor temperature by the time. Integration is performed by element 128. Element 130 determines whether the integrated sum is greater than 150 degree minutes. If no, control is returned to element 104 for reconsideration of each of the three termination conditions.

If element 130 determines that the integrated sum is greater than 150 degree minutes, the pull down mode will be terminated as a safety measure. Element 132 deactivates the high cool mode and activates the low cool mode. Element 134 sets the discharge monitor, and exit is obtained via element 136.

FIG. 3, comprising FIGS. 3A, 3B, 3C, 3D, and 3E, provides a flowchart for the operation of a refrigeration control system in accordance with a preferred embodiment of the present invention. The process is begun at element 140. Pull down is accomplished at element 142. In the preferred mode and not to be considered limiting of the present invention, pull down is accomplished in accordance with the flowchart of FIG. 2.

Following pull down, element 146 reads discharge air temperature sensor 94 (see also Fig 1). Similarly, element 148 reads return air temperature sensor 91. Element 150 determines whether the system is in discharge mode. If the system has just completed pull down, the discharge mode may have been initiated by element 110 of FIG. 2. Discharge mode may also be set by element 164 as explained in further detail below. In either case, the discharge mode means that discharge air temperature sensor 94 is the primary control sensor. This mode will continue until the mode is changed as described in more detail below.

In the discharge mode, element 152 determines whether the return air temperature as measured by return air temperature sensor 91 is less than the set point. If it is, control is given to element 158, which changes the system to return mode. If the return air temperature is not less than the set point, return mode may be set by element 158 if element 154 determines the heat exchange system is in the heat mode. This means that heat is being added rather than removed from refrigerated space 92.

Element 156 sets the proportional error (i.e. P) equal to the discharge air temperature minus the floor value, if not in the heat mode, the return air temperature is not less than the set point, and the system is in the discharge mode. The value of P is used in the manner described below to control modulation valve 54.

For return mode as determined by element 160, the primary control element is return air temperature sensor 91. In this mode, element 162 determines whether the discharge temperature is less than the floor temperature. If yes, element 164 changes the system to the discharge mode. If the discharge air temperature is not less than the floor temperature, control is routed by element 162 to element 166, which sets P (i.e. proportional error variable) to the return air temperature minus the set point.

After discharge mode processing and return mode processing, element 141 begins the scaling of P. If P is between zero and one, control is given to element 143 which sets P to zero. This ensures that if the proportional error is a positive fraction of a degree, it will be treated as no error at all. Element 144 is merely a connector of the logic flow.

Element 145 determines whether P is greater than or equal to one. If yes, one is subtracted from P at element 147. If element 149 determines that P is greater than five, P is set to five. This limits the effective positive proportional range to six. Similarly, if element 153 finds P to be less than negative five, element 155 sets it to negative five. Therefore, P becomes scaled as a number between negative five and positive five.

Integration of proportional error is initiated at element 168, which determines if the absolute value of P is greater than 2.5. If it is, element 170 integrates at 50 per hour. Otherwise, element 172 integrates at the rate of 10 per hour. Element 164 is merely a connector.

If I is greater than five as determined by element 165, element 167 sets I equal to five. Similarly, if element 169 finds I to be less than negative five, element 171 sets I to negative five. Therefore, it can be seen that the integrated proportional error (i.e. I) is scaled to be a number between negative five and positive five. Element 174 adds P and I to produce a single number, thus scaled between negative ten and positive ten.

Element 173 determines whether the sum of P and I is greater than six. If it is, element 175 sets the sum to six, thereby further scaling the sum to a number no greater than six. Similarly, element 177 determines if the sum of P and I is less than negative six. If it is, element 179 sets the sum to negative six. Therefore, the sum of P and I is scaled to a number between negative and positive six.

If the system is in the high cool mode, element 176 routes control to element 178, which determines whether P is less than 2. If it is, element 180 switches the system to the low cool mode. If not, control is routed to element 182 via connector element 181. If the system is determined by element 182 to be in the low cool mode, element 184 determines whether the sum of P and I is greater than 5.5. If yes, then the error is currently within the maximum range and element 186 "debounces" the indication by requiring an appropriate delay. If the time has not yet elapsed, element 188 further increments the delay. If the delay has been satisfied, element 194 initiates the high cool mode.

If element 184 finds that the sum of P and I is not greater than 5.5, element 190 determines whether the sum is less than 0.5. If yes, the error is small enough to set the low cool with hot gas by pass mode by element 196. The modulation valve is set by element 192 if the sum of P and I is between 0.5 and 5.5. A lesser level of error does not result in a change in the setting of the modulation valve.

A determination is made by element 198 concerning the low cool with by pass mode of operation. If that is the current mode, element 200 determines whether the sum of P and I is greater than 5.5. If greater, the error is too great to be accommodated by that mode and element 202 puts the system in the low cool mode. If element 200 finds the error sum to be less than 5.5, element 204 determines whether the sum of P and I is less than 0. This means that refrigerated space 92 is cooler than necessary.

When the error is negative, element 206 determines whether the return air temperature minus the predetermined set point is less than 1. If so, the refrigerated space temperature must be raised by the . low heat mode as initiated by element 208. The modulation valve position is reset by element 210.

Element 212 determines whether the refrigeration system is in the low heat mode. If yes, element 214 ascertains whether the error sum is greater than 0.5. If it is, the low cool with hot gas by pass mode is set by element 216 and the modulation valve is set by element 218. When element 214 finds the error sum to be less than or equal to 0.5, element 220 checks whether P plus I is less than negative 5. If not, element 226 simply repositions the modulation valve. If the error sum is more negative than five, the refrigerated space is substantially cooler than desired, and following "debounce" by delay element 222, the high heat mode is set by element 228. If the delay has not yet been satisfied, element 224 simply increments the delay. Element 229 is merely a connector.

The high heat mode is checked by element 230. If that is the current mode, control is routed to element 232 which determines if the error sum is greater than zero. If it is, the refrigerated space may yet be cooler than desired, but not substantially so. Element 234 places the system in the low heat mode. The modulation valve is repositioned by element 236. Element 238 functions to return to the beginning of the logic loop after the passage of the appropriate time. Return is symbolized by connector element 144.

Figure 4:
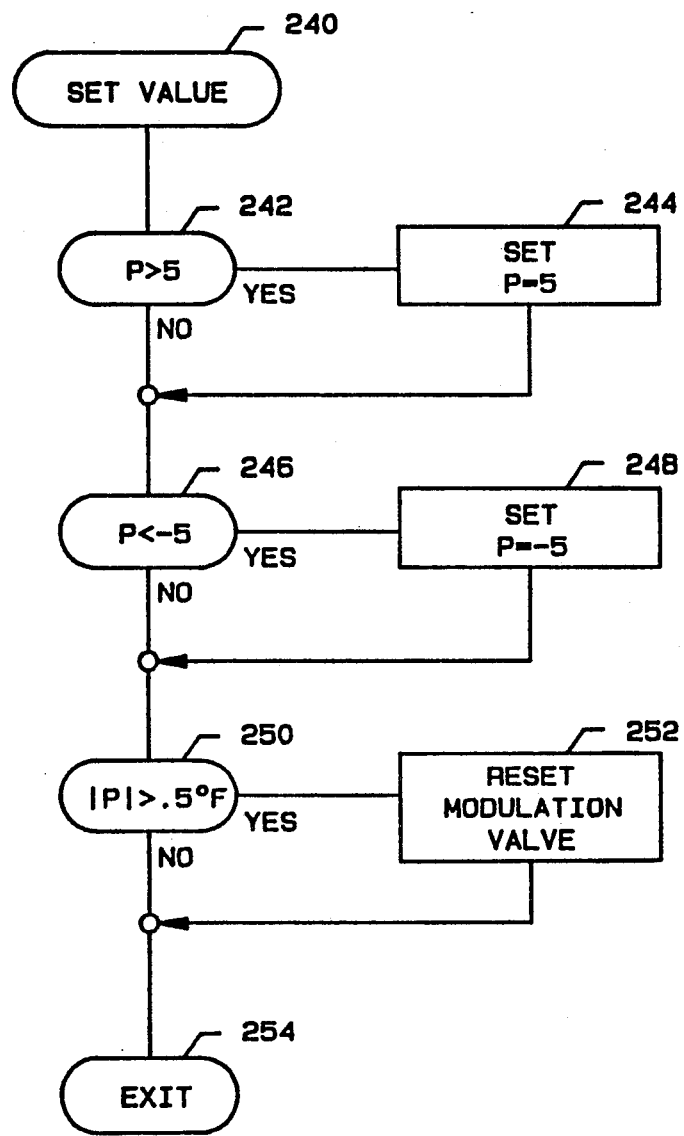
FIG. 4 is a flowchart for an alternate manner of handling operation of the modulation valve.

FIG. 4 is a flow chart for the operation of an alternate means of repositioning modulation valve 54. This schematically represents the repositioning of the valve only when the error is greater than one-half degree. Entry is via element 240. Positive scaling is accomplished by element 242, which routes control to element 244 to ensure that P is not permitted to exceed positive five. Similarly, negative scaling is performed by elements 246 and 248.

After the proportional error, P, is scaled between negative and positive five, element 250 determines whether the absolute value of P is greater than one-half. In this way, the alternative embodiment repositions modulation valve 54 only when the proportional error exceeds one-half degree. Exit is via element 254.

Figure 5:
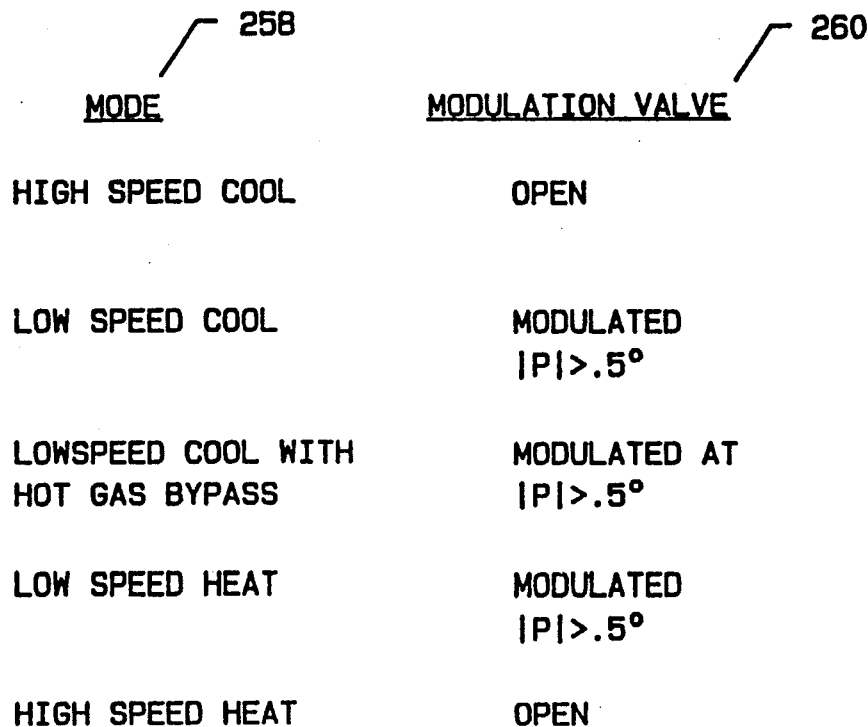
FIG. 5 is a table of the operating modes of the preferred modes of the present invention.

FIG. 5 is a table showing the various operational modes 258 and the corresponding operation of modulation valve 54 shown in column 260. Note that modulation valve 54 is open in both high speed cool and high speed heat modes. The remaining modes of low speed cool, low speed cool with hot gas by pass, and low speed heat all involve repositioning of modulation valve 54. Note that in these three modes, however, the system repositions modulation valve 54 only when the absolute value of the proportional error, P, is greater than one-half degree.

Figure 6:
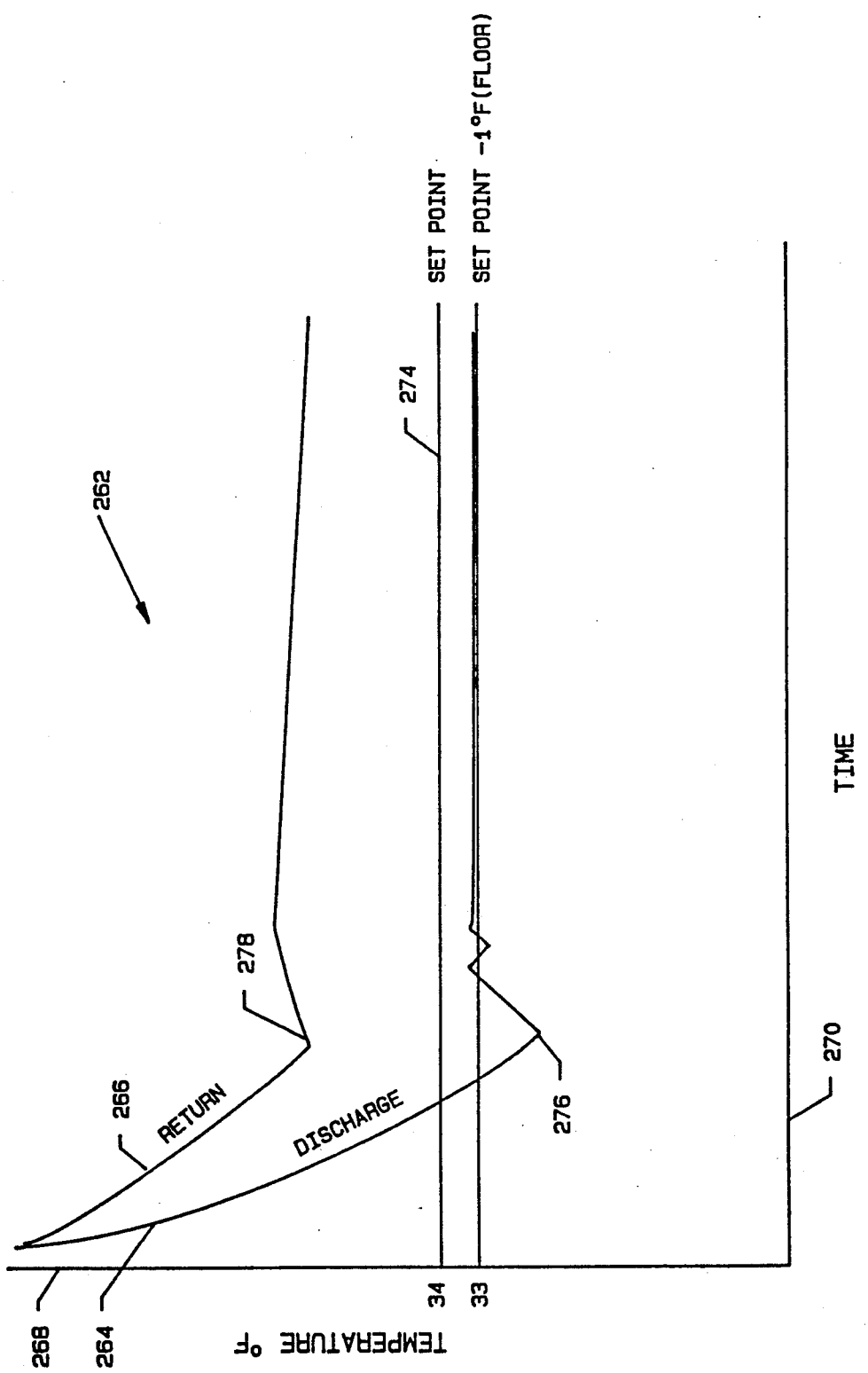
FIG. 6 is a graphical representation of the operation of the pull down mode.

FIG. 6 is a graphical representation 262 of the two normal conditions under which the pull down mode is terminated. The graph shows temperature 268 as a function of time 270. In this particular situation, and not to be considered as limiting of the present invention, the set point 34 is established at 34°.

A first termination condition concerns discharge temperature 264 shown during the pull down mode. Termination of the pull down mode may occur whenever discharge air temperature 264 is more than ten degrees below set point 34 as shown at point 276. This results in a setting of the discharge monitor (see also element 106 of FIG. 2).

The second normal termination condition occurs when return air temperature 266 becomes less than one degree greater than set point 274 as represented by point 278. The second termination condition results in setting of the return monitor (see also element 116 of FIG. 2).

Figure 7:
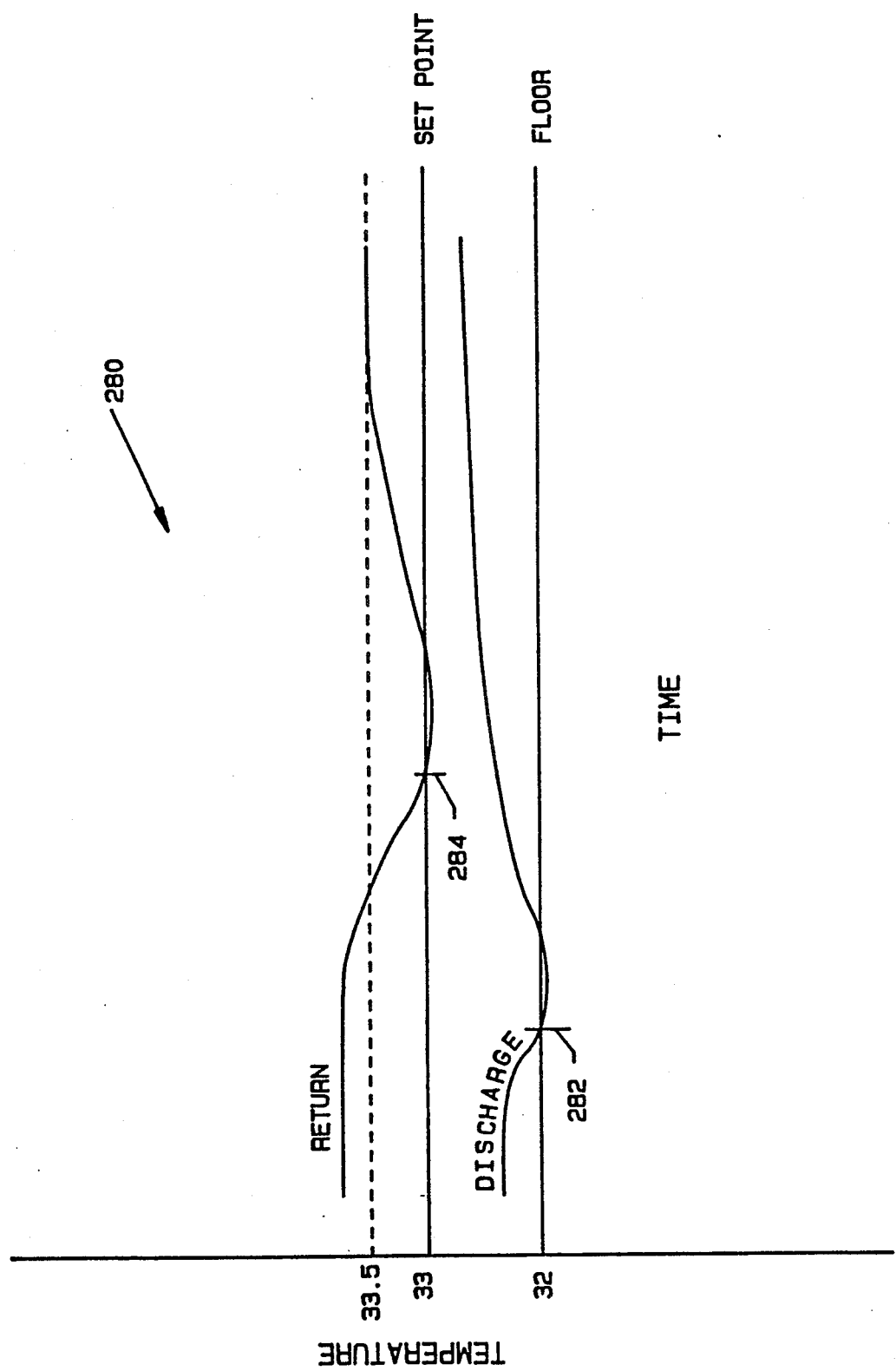
FIG. 7 is a graphical representation of the conditions prompting change of sensor; and, FIG. 8 is a graphical representation of changes of mode of the refrigeration system.

FIG. 7 is a graphical representation 280 of the points 282 and 284 at which the system changes sensors. The temperature values given should be considered as exemplary only and are not intended to be limiting of the present invention. Point 282 shows a switch from control of the system by measurement from the return air temperature sensor to measurement from the discharge air temperature sensor. This occurs when the discharge air temperature is measured to be below the floor temperature. This is an attempt to control the system to prevent freezing of the cargo nearest the discharge port 93.

Similarly, the system is switched to control by the return air temperature sensor at point 284. This corresponds to the set point for the return air temperature. This is the normal desired operating point.

Figure 8:
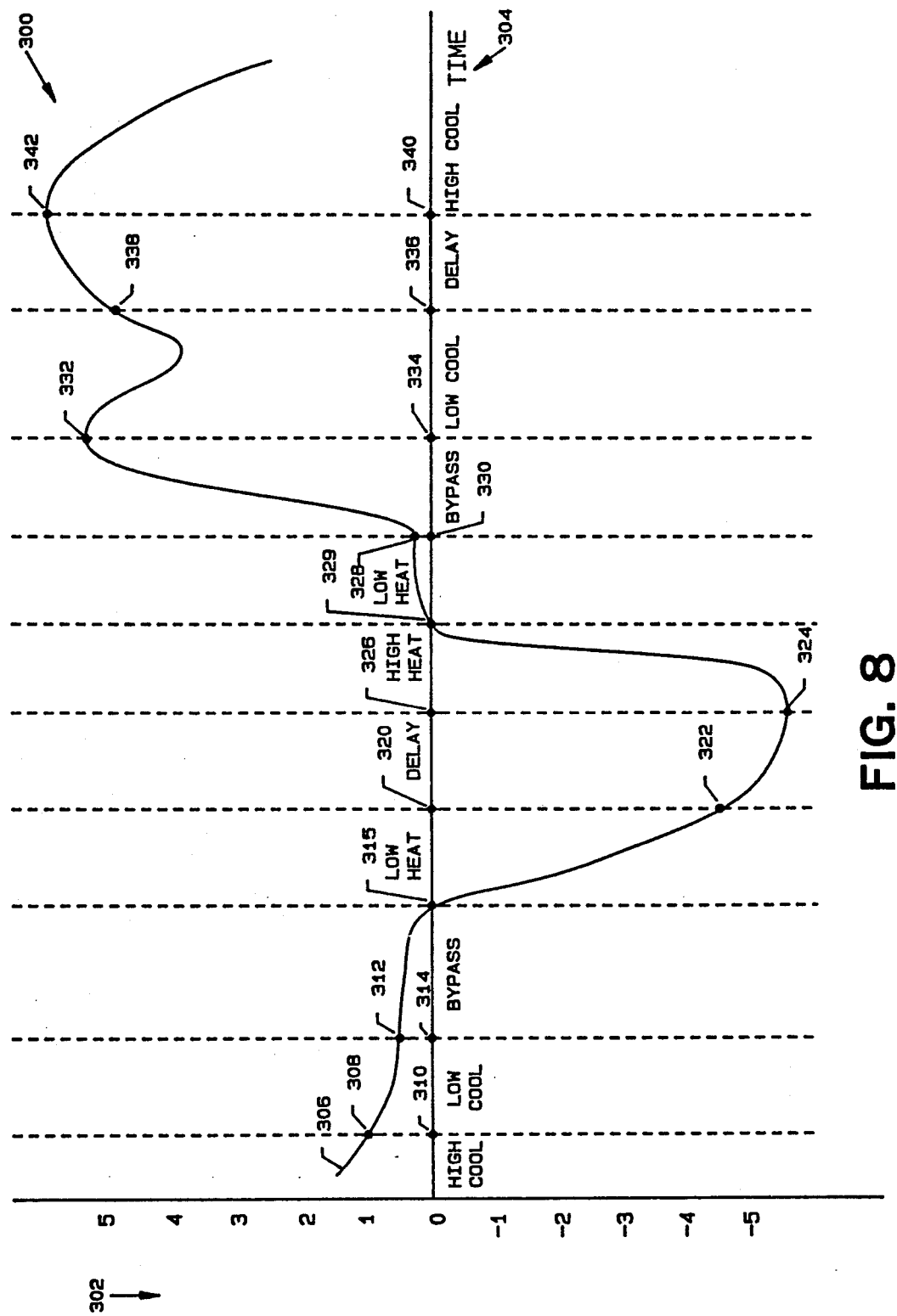

FIG. 8 is a graphical representation 300 of the error condition values 302 which correspond to operational mode changes during time 304. In nearly all cases, this error is the sum of the proportional error, P, and the integrated proportional error, I. This is not always the case, however, as mode may change as a function of P only when a transition from high speed cool to low speed cool is made (see also FIG. 3C, element 178).

Curve 306 undergoes a transition from high speed cool to low speed cool at an error of positive 1. This corresponds to time 310. The change to the low speed cool with hot gas by pass happens at an error of positive 312 at time 314. Low speed heat mode is entered at point 315 as a result of the error value crossing zero.

The system begins a delay period from time 320 to time 326 prior to changing into high speed heat mode when curve 306 crosses a negative four degree error at point 322. The high speed heat mode is actually entered at point 324. The system reverts to the low speed heat mode at point 329 as curve 306 crosses the point of zero error. As the error increases to a positive one-half degree, the system is switched to the low speed cool mode with hot gas by pass at point 328 and time 330. This corresponds to a period (i.e. time 326 to time 330) in which refrigerated space 92 has an internal temperature of slightly higher than that desired.

As the error increases to a positive 5.5 (i.e. the temperature has increased), the system is placed in the low speed cool mode at point 332 which corresponds to time 334. Time 336 to time 340 is the delay period during which the system remains in the low speed cool mode. The positive error increases to 5.5 at point 338. The high speed cool mode is entered at point 342 following the delay from 336 to 340. Again note that the error value is generally the sum of the proportional error, P, and the integrated proportional error, I. However, the transition from high speed cool mode to low speed cool mode at point 308 is controlled by the value of P only (see also FIG. 3C, element 178).

Having thus described the preferred embodiments of the present invention, those of skill in the art will readily appreciate that yet other embodiments may be designed which fall within the scope of the claims hereto attached.

We claim:

1. An apparatus for controlling a system for regulating temperature within a space comprising:
   a. a first sensor for measuring a first parameter of said system;
   b. a second sensor for measuring a second parameter of said system;
   c. means coupled to said first sensor and said second sensor for generating an error signal in response to said first parameter and said second parameter;
   d. means coupled to said generating means for computing an integrated error signal at an integration rate determined by said error signal;
   e. means for algebraically combining said error signal and said integrated error signal to produce a combined error signal; and,
   means coupled to said algebraically combining means for adding heat to said space and removing heat from said space in proportion to said combined error signal.

2. An apparatus according to claim wherein said first sensor further comprises a temperature sensor.

3. An apparatus according to claim 2 wherein said second sensor further comprises a temperature sensor.

4. An apparatus according to claim 3 wherein said first sensor measures temperature of discharge air from said system.

5. An apparatus according to claim 3 or claim 4 wherein said second sensor measures temperature of return air from said space.

6. An apparatus according to claim 5 further comprising means coupled to said generating means for selecting a one of said first parameter and said second parameter for generating said error signal from said selected parameter.

7. An apparatus according to claim 6 wherein said generating means compares said selected parameter to a predetermined temperature to generate said error signal.

8. A method of controlling a temperature regulating system comprising:
   a. measuring a first parameter of said system;
   b. measuring a second parameter of said system;
   c. deciding from the value measured of said first parameter and said second parameter whether to control said system by said first parameter or said second parameter;
   d. computing an error signal from said selected parameter;
   e. computing an integrated error signal from said error signal by integrating at a rate determined by said error signal;
   f. algebraically combine said error signal and said integrated error signal to produce a combined error signal; and,
   g. controlling said system in response to said combined error signal.

9. A method according to claim 8 wherein said first parameter is temperature of return air from said space.

10. A method according to claim 9 wherein said second parameter is temperature of discharge air from said system.

11. A method according to claim 10 wherein said deciding step selects said first parameter if said first parameter is less than a predetermined set point.

12. A method according to claim 10 or 11 wherein said deciding step selects said second parameter if said second parameter is less than a predetermined floor temperature.

* * * * *